United States Patent
Kikuchi et al.

(10) Patent No.: US 7,333,786 B2
(45) Date of Patent: Feb. 19, 2008

(54) RELAYING APPARATUS AND COMMUNICATION SYSTEM

(75) Inventors: Akihiro Kikuchi, Chiba (JP); Junichi Sawada, Tokyo (JP); Masato Ishigaki, Miyagi (JP)

(73) Assignee: Sony Corporation (JP)

( * ) Notice: Subject to any disclaimer, the term of this patent is extended or adjusted under 35 U.S.C. 154(b) by 317 days.

(21) Appl. No.: 10/944,915

(22) Filed: Sep. 21, 2004

(65) Prior Publication Data

US 2005/0125093 A1 Jun. 9, 2005

(30) Foreign Application Priority Data

Oct. 1, 2003 (JP) ............................. 2003-343616

(51) Int. Cl.
 G06F 3/033 (2006.01)
 H04B 1/06 (2006.01)
(52) U.S. Cl. ..................... 455/130; 455/269; 455/41.1; 340/10.1
(58) Field of Classification Search ................ 455/130, 455/269, 274, 272, 178.1, 191.1, 193.1, 39, 455/193.2, 70, 120, 121, 7, 41.1, 41.2, 41.3, 455/66.1, 67.13, 67.11, 556.1, 557, 344, 550.1, 455/456.1, 562.1; 343/866, 718, 893, 852, 343/867; 340/5.1, 10.1, 572.1, 572.7, 539.26, 340/10.3, 825.49; 700/213
See application file for complete search history.

(56) References Cited

U.S. PATENT DOCUMENTS 6,307,517 B1 * 10/2001 Lee .......................... 340/572.1
6,574,454 B1 * 6/2003 Tuttle ........................ 455/41.1
7,050,007 B2 * 5/2006 Akiho et al. ................. 343/866

(Continued)

FOREIGN PATENT DOCUMENTS

JP 2000-137779 5/2000

(Continued)

OTHER PUBLICATIONS

Japanese Action; Application No.: 2003-343616; dated Oct. 31, 2006.

Primary Examiner—Quochien B. Vuong
(74) Attorney, Agent, or Firm—Rader Fishman & Grauer PLLC; Ronald P. Kananen

(57) ABSTRACT

A relaying device for providing optimum communication between a non-contact information medium and an information read/write device, and a communication system employing the relaying device, in which the adverse effect on communication, brought about by limitations on the mounting site of the information read/write device may be eliminated. The relaying device is formed by a resonance circuit 34 including a first antenna coil 31, electro-magnetically coupled to an antenna coil 11 of the information read/write device 10, a second antenna coil 32, connected in series with the first antenna coil 31 and electro-magnetically coupled to an antenna coil 21 of the non-contact information medium 20, and a tuning capacitor 33 connected in series with the first antenna coil 31 and the second antenna coil 32. The first antenna coil 31, second antenna coil 32 and the tuning capacitor 33 making up the resonance circuit 34 is resonated with the same resonance frequency as that of the resonance circuit 13 of the information read/write device 10 and that of the resonance circuit 23 of the non-contact information medium 20.

21 Claims, 12 Drawing Sheets

U.S. PATENT DOCUMENTS

| | | | |
|---|---|---|---|
| 2003/0181229 A1* | 9/2003 | Forster et al. | 455/562.1 |
| 2004/0132406 A1* | 7/2004 | Scott et al. | 455/41.1 |
| 2004/0198233 A1* | 10/2004 | Pratt et al. | 455/67.11 |
| 2004/0203478 A1* | 10/2004 | Scott | 455/556.1 |
| 2005/0170784 A1* | 8/2005 | Ariyoshi et al. | 455/67.13 |
| 2005/0186902 A1* | 8/2005 | Lieffort et al. | 455/41.1 |
| 2005/0242957 A1* | 11/2005 | Lindsay et al. | 340/572.7 |
| 2006/0009251 A1* | 1/2006 | Noda et al. | 455/550.1 |

FOREIGN PATENT DOCUMENTS

| | | |
|---|---|---|
| JP | 2000-138621 | 5/2000 |
| JP | 2000-216715 | 8/2000 |
| JP | 2000-315908 | 11/2000 |
| JP | 2003-187195 | 7/2003 |
| JP | 2004-029873 | 1/2004 |

* cited by examiner

RELAYING APPARATUS AND COMMUNICATION SYSTEM

BACKGROUND OF THE INVENTION

FIELD OF THE INVENTION

This invention relates to an RFID (Radio Frequency IDentification) employing a non-contact information medium, such as a non-contact IC (Integrated Circuit) tag or a non-contact IC card. More particularly, it relates to a relaying device for providing optimum communication between a non-contact information medium and an information read/write device, and to a communication system employing the relaying device.

The RFID system, as the communication system employing a non-contact information medium, such as a non-contact IC card or a non-contact IC tag, has been devised and put to practical use. The RFID system allows information communication to be performed between an IC chip enclosed in the non-contact information medium, and a reader/writer, and is utilized in an automatic ticket checker in a railroad station or for book lending in a lending library. It is estimated that, in near future, the system will be used for exchanging the private information in a wide variety of fields.

The non-contact IC card is a generic term for a card-shaped non-contact information medium, such as a so-called credit card. On the other hand, the non-contact IC tag is a generic term for a non-contact information medium of a shape other than the card shape, a non-contact information medium of a label size smaller than the credit card size, such as a stamp size or a size smaller than the stamp size, or a non-contact information medium of a round or a star shape.

In the RFID system by the electro-magnetic coupling system, the non-contact information medium receives electrical waves, transmitted from the reader/writer, to obtain the operating power from the received electrical waves by electro-magnetic induction, and effects data communication with the reader/writer by exploiting the received electrical waves. The non-contact information medium and the reader/writer each include an antenna coil for transmitting/receiving the electrical waves. The optimum communication distance between the reader/writer of the electro-magnetic coupling system and the non-contact information medium is usually several cm to tens of cm.

[Patent Publication 1] Japanese Laid-Open Patent Publication 2000-315908

For example, if the non-contact information medium is a non-contact IC card, the card size of the same size as the credit card size (54 mm in length, 85.6 mm in width and 0.76 mm in thickness), as provided for by the ISO (International Organization for Standardization), is generally used.

In such case, the antenna coil 100, enclosed in the non-contact IC card, is sized to approximately the size of the non-contact IC card, in order to permit the largest amount possible of the flux from the reader/writer as possible to traverse the inside of the coil, as shown in FIG. 17A. If the non-contact information medium is a non-contact IC tag, the antenna coil is of such a shape as to permit the largest amount possible of the flux to traverse the inside of the coil, depending on the standard or the size of the non-contact IC tag.

In this manner, the shape of the antenna coil of the non-contact information medium is determined to a more or less extent by e.g. the relevant standard.

On the other hand, the shape of the antenna coil of the reader/writer is appreciably influenced by the structure of the equipment carrying the reader/writer thereon.

In case the inside space of a casing of the device carrying the reader/writer thereon is occupied by densely arranged component parts, there is not sufficient space available for properly mounting the reader/writer. In such case, the antenna coil area is decreased compared to the available space in the casing, or the reader/writer is mounted on the back side of the casing of the carrying device, in order to exploit the small space left in the casing.

In particular, if the reader/writer is mounted on the back side of the casing of the carrying device, an aperture must be formed in a portion of the casing in order to pass the magnetic flux emanating from the magnetic field generated by the antenna coil of the reader/writer to the antenna coil of the non-contact information medium.

In general, the casing is provided for protecting the circuitry in the casing against impacts from outside, or for shielding the electro-magnetic noise, emanating from the electronic circuit in the casing and hence the processing such as perforating the casing is to be avoided as far as is possible. If the casing is to be perforated, out of necessity, the area of an aperture produced needs to be as small as possible.

Consequently, the antenna coil of the reader/writer is of an extremely small size as compared the size of the antenna coil enclosed in the non-contact information medium. For example, an antenna coil 200 of the reader/writer, shown in FIG. 17B, is of a size appreciably smaller than the size of the antenna coil 100 enclosed in the inside of the non-contact IC card shown in FIG. 17A.

If the size of the antenna coil on the reader/writer side is this small, the amount of the magnetic flux generated by the current flowing in the antenna coil is also extremely small, so that, if the non-contact information medium is moved to the vicinity of the antenna coil of the reader/writer, the amount of the magnetic flux necessary to operate the non-contact information medium cannot be generated.

FIG. 18 shows the manner in which the magnetic flux by the magnetic field generated by the antenna coil 200 provided to the reader/writer traverses the inside of the antenna coil 100 enclosed within the non-contact IC card. As may be seen from FIG. 18, since it is the magnetic flux by the magnetic field at the center of the antenna coil 200 that traverses the inside of the antenna coil 100, the antenna coil 100 must be moved to a position closer to the antenna coil 200 in order to procure an appropriate amount of the magnetic flux.

FIG. 19 shows a communication system 150, made up by a reader/writer 201 having an antenna coil 200, mounted to the back side of the metal casing 205, and by a non-contact IC card 101, having an antenna coil 100.

The reader/writer 201 includes an antenna coil 200, as an inductor arranged on a substrate 204, a tuning capacitor 203, connected in series with the antenna coil 200, to form a parallel resonance circuit, and an IC for a reader/writer 202 for controlling the data transmission/receipt with the non-contact IC card 101. A casing 205, having the reader/writer 201 mounted thereon, is perforated at 205A in register with the antenna coil 200.

In a majority of cases, the casing 205 of the equipment, adapted for loading the reader/writer 201 thereon, is formed of metal for procuring the strength or for preventing leakage to outside of the electro-magnetic noise caused by the internal electronic circuitry. However, if a substrate 204 is mounted to the metal casing 205, the magnetic flux of the magnetic filed, generated by the antenna coil 200, is lost in the casing 205, such that it is only the small amount of the magnetic flux generated at the center of the antenna coil 200 that is allowed to pass through the inside of the antenna coil of the non-contact IC card 101.

Thus, with the communication system 150, shown in FIG. 19, the non-contact IC card 101 and the reader/writer 201 cannot communicate with each other.

That is, a wide variety of constraints are imposed on the antenna coil of the reader/writer, by the structure of the equipment adapted for loading the reader/writer thereon, such that it is difficult to set the antenna coil shape or area in such a manner as to permit optimum communication with the non-contact information medium. There is also a problem that, given the limited space within the equipment adapted for loading the reader/writer thereon, it is also extremely difficult to eliminate the adverse effect of the metal components interfering with the wireless communication.

For overcoming this deficiency, the antenna coil of the reader/writer 201 is designed as an antenna coil 210 substantially coextensive as the antenna coil of the non-contact IC card, and is mounted on the back side of a resin cover 220, fitted to the casing 205, so as to operate as a relaying antenna, as shown in FIG. 21. In this manner, it is possible to cope with the constraint of the antenna area or to eliminate the adverse effect from the metal casing 205.

The antenna coil 210 is connected to the substrate 204 by fitting a jack 212, mounted to the distal end of a lead wire 211, extending from the antenna coil 210, into a plug 213 provided to the substrate 202 exposed through the aperture 205A formed in the casing 205.

Consequently, the antenna coil 210 is inconvenient to mount or dismantle, especially for maintenance, such that, in the worst of cases, the lead wire 211 may be ruptured, or the reader/writer 201 may be destroyed.

SUMMARY OF THE INVENTION

In view of the above-depicted status of the art, it is an object of the present invention to provide a relaying device and a communication system in which, in wireless communication by the electro-magnetic coupling system between an information read/write device and a non-contact information medium, mediated by a carrier wave of a preset frequency, the adverse effect on the communication, brought about by the limitation as to the mounting site of the information read/write device, may be eliminated, and the use configuration of the information read/write device and a non-contact information medium may be flexibly coped with to achieve optimum communication.

In one aspect, the present invention provides a relaying apparatus for relaying wireless communication of the electro-magnetic coupling system, mediated by a carrier wave of a preset frequency, between an information read/write device and a non-contact information medium. The relaying apparatus comprises a first antenna coil electro-magnetically coupled to an antenna coil of the information read/write device, a second antenna coil, connected in series with the first antenna coil and electro-magnetically coupled with an antenna coil of the non-contact information medium, and a tuning capacitor connected in series with the first antenna coil and with the second antenna coil. The first antenna coil, second antenna coil and the tuning capacitor form a resonance circuit resonated at the resonance frequency which is the same as the resonance frequency of a resonance circuit of the read/write device and the resonance frequency of a resonance circuit of the non-contact information medium.

In another aspect, the present invention provides a relaying device for providing optimum communication between a non-contact information medium and an information read/write device, and a communication system employing the relaying device, in which the adverse effect on communication, brought about by limitations on the mounting site of the information read/write device may be eliminated. The relaying device is formed by a resonance circuit including a first antenna coil, electro-magnetically coupled to an antenna coil of the information read/write device, a second antenna coil, connected in series with the first antenna coil and electro-magnetically coupled to an antenna coil of the non-contact information medium, and a tuning capacitor connected in series with the first antenna coil and the second antenna coil. The first antenna coil, second antenna coil and the tuning capacitor making up the resonance circuit is resonated with the same resonance frequency as that of the resonance circuit of the information read/write device and that of the resonance circuit of the non-contact information medium.

In a further aspect, the present invention provides a communication system for wireless communication of the electro-magnetic coupling system, mediated by a carrier wave of a preset frequency, in which the communication system comprises an information read/write device including a first resonance circuit made up by a first antenna coil and by a first tuning capacitor connected in series with the first antenna coil, with the information read/write device having wireless communication with a circuit electro-magnetically coupled to the first antenna coil, with the resonance frequency of the first resonance circuit as the frequency of the carrier wave. The communication system also comprises a non-contact information medium including a second resonance circuit made up by a second antenna coil and by a second tuning capacitor connected in series with the second antenna coil, with the second resonance circuit resonating with a resonance frequency which is the same as the resonance frequency of the first resonance circuit and having wireless communication with a circuit electro-magnetically coupled to the second antenna coil, and a relaying device including a third resonance circuit, made up by a third antenna coil, electro-magnetically coupled to the first antenna coil of the information write device, a fourth antenna coil connected in series with the third coil and electro-magnetically coupled with the antenna coil of the non-contact information medium, and a third tuning capacitor connected in series with the third and fourth antenna coils. The third relaying circuit resonates with the same resonance frequency as the resonance frequency of the first resonance circuit and the second resonance circuit. The relaying device relays the wireless communication between the information read/write device and the non-contact information medium.

In yet another aspect, the present invention provides a communication system for wireless communication of the electro-magnetic coupling system, mediated by a carrier wave of a preset frequency, in which the communication system comprises an information read/write device including a first resonance circuit made up by a first antenna coil and by a first tuning capacitor connected in series with the first antenna coil, with the information read/write device having wireless communication with a circuit electro-magnetically coupled to the first antenna coil, with the resonance frequency of the first resonance circuit as the frequency of the carrier wave. The communication system also comprises a non-contact information medium including a second resonance circuit made up by a second antenna coil and by a second tuning capacitor connected in series with the second antenna coil, with the second resonance circuit resonating with a resonance frequency which is the same as the resonance frequency of the first resonance circuit and having wireless communication with a circuit electro-magnetically coupled to the second antenna coil, and a relaying device including a third resonance circuit, made up by a third antenna coil, electro-magnetically coupled to the first antenna coil of the information write device, a fourth antenna coil connected in series with the third coil and electro-magnetically coupled with the antenna coil of the non-contact information medium, and a third tuning capacitor connected in series with each of the third and fourth antenna coils. The third relaying circuit resonates with the same resonance frequency as the resonance frequency of the first resonance circuit and the second resonance circuit. The relaying device relays the wireless communication between the information read/write device and the non-contact information medium.

The relaying device of the present invention includes, for wireless communication by the electro-magnetic coupling system between the information read/write device and the non-contact information medium, a first antenna coil, electro-magnetically coupled to an antenna coil of the information read/write device, and a second antenna coil, electro-magnetically coupled to an antenna coil of the non-contact information medium, and assures optimum wireless communication even in cases wherein the antenna coil of the information read/write device has a shape and a size differing appreciably from those of the antenna coil of the non-contact information medium.

The wireless communication between the non-contact information medium and a wide variety of use configurations of the read/write device may be optimized by a simple technique of changing the size/shape of the first and second antenna coils of the relaying device so that the first and second antenna coils may be electro-magnetically coupled to the antenna coils of the information read/write device and the non-contact information medium, respectively.

The communication system of the present invention includes, for wireless communication by the electro-magnetic coupling system between the information read/write device and the non-contact information medium, a third antenna coil, electro-magnetically coupled to the first antenna coil of the information read/write device, and a fourth antenna coil, electro-magnetically coupled to the second antenna coil of the non-contact information medium, and assures optimum wireless communication even in cases wherein the antenna coil of the information read/write device has a shape and a size differing appreciably from those of the antenna coil of the non-contact information medium.

Moreover, the wireless communication between the non-contact information medium and a wide variety of use configurations of the read/write device may be optimized by a simple technique of changing the size/shape of the third and fourth antenna coils of the relaying device of the communication system so that the third and fourth antenna coils will be electro-magnetically coupled to the first antenna coils of the information read/write device and the second antenna coil of the non-contact information medium, respectively.

In case limitations are imposed on the space in which to mount the first antenna coil, it is sufficient that the third antenna coil is changed in shape/size so as to be electrically coupled to the first antenna coil. In case limitations are imposed that the first antenna coil has to be mounted on a metal component, such as a casing, the size of the first antenna coil or the aperture formed in the casing may be of the smallest size possible to assure the strength of the casing as well as to avoid adverse effects by the metal components.

The relaying device of the communication system of the present invention performs wireless communication of the electromagnetic coupling system with the information read/write device, no laborious processing, such as wiring, is needed, and is able to relay the wireless communication with the non-contact information medium by fitting the relaying device on a removable cover or to a door that may be opened/closed.

DESCRIPTION OF THE PREFERRED EMBODIMENTS

Figure 1:
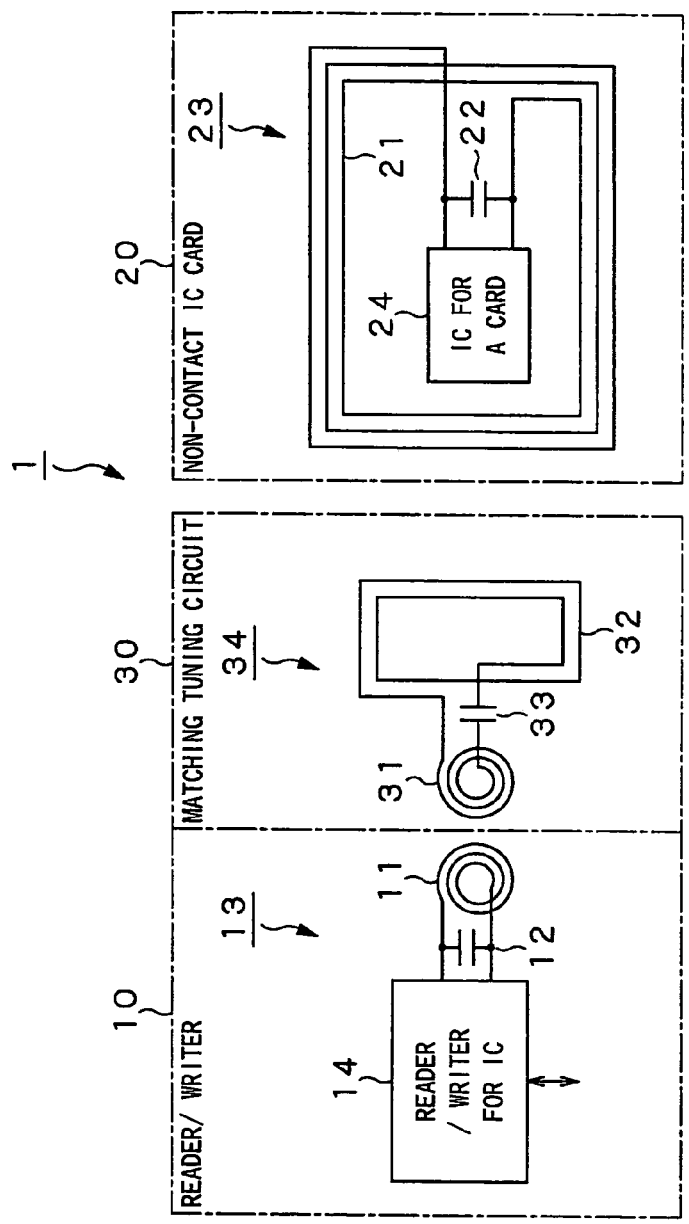
FIG. 1 illustrates the configuration of a communication system sowing the best embodiment of the present invention.
Figure 2:
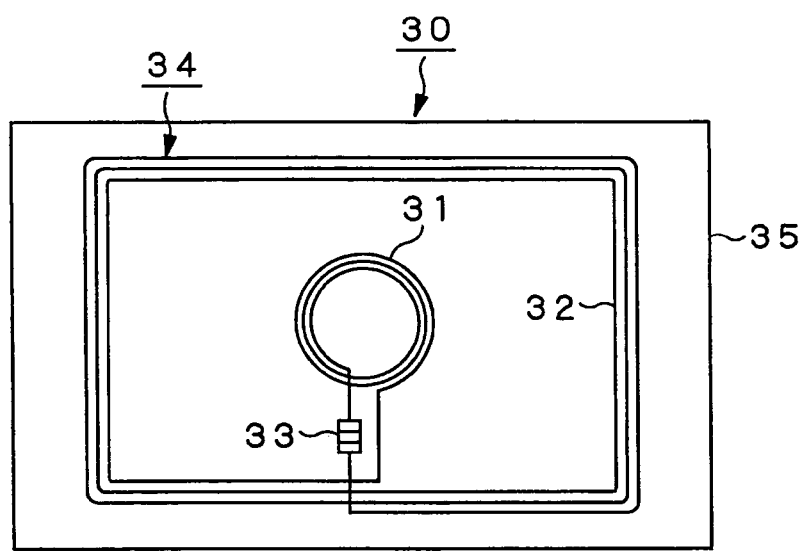
FIG. 2 illustrates the configuration of a matching tuning circuit of the communication system.

Referring now to the drawings, the best embodiments of a relay apparatus and a communication system of the present invention are explained in detail.

Referring first to FIG. 1, a communication system 1 as the best embodiment for carrying out the present invention is explained.

The communication system 1, shown in FIG. 1, is an RFID (Radio Frequency Identification), by the electromagnetic coupling system, provided with a reader/writer 10, a non-contact IC card 20, and a matching tuning circuit 30.

In this communication system 1, the non-contact IC card 20, as a non-contact information medium, receives electrical waves, transmitted from the reader/writer 10 through the matching tuning circuit 30, to obtain the power by electromagnetic induction, and has data communication with the reader/writer 10, with use of the electrical waves, through the matching tuning circuit 30.

The reader/writer 10 includes a parallel resonance circuit 13, comprised of a serial connection of an antenna coil 11, as an inductor, and a tuning capacitor 12. A reader/writer for IC 14 is connected in parallel with this parallel resonance circuit 13. The reader/writer 10 is tuned to a frequency fc in the vicinity of, for example, 13.56 MHz, as the a.c. voltage is applied to the parallel resonance circuit 13, under control by the reader/writer for IC 14.

The reader/writer 10 has wireless communication with the non-contact IC card 20, using the electrical waves, which have modulated a carrier having this frequency fc as the carrier frequency. Although the carrier frequency is the frequency fc, in the following explanation, the carrier frequency fc is not limited to 13.56 MHz.

The reader/writer for IC 14 is provided with an interfacing circuit, not shown, and is connected to and controlled by a CPU (central processing unit) of a counterpart device, having loaded thereon the reader/writer 10.

The reader/writer for IC 14 controls the operation in sending data from the reader/writer 10 to the non-contact IC card 20 and in receiving data sent from the non-contact IC card 20.

In data transmission, the reader/writer for IC 14 modulates the carrier wave of the carrier frequency fc with data being transmitted to generate transmission signals. As the data modulating system, ASK (amplitude shift keying), PWM (pulse width modulation) or the PSK (phase shift keying), for example, may be used.

The transmission signals, generated on modulation, are sent to the antenna coil 11 to generate a magnetic field. The magnetic field, generated in the antenna coil 11, is changed in keeping with the transmission signals, such that data carried by the carrier wave with the carrier frequency fc is transmitted, as changes in the magnetic flux, to an antenna coil 31 of the matching tuning circuit 30, electro-magnetically coupled to the antenna coil 11.

In data receipt, the reader/writer for IC 14 demodulates the data, transmitted from the non-contact IC card 20 through the matching tuning circuit 30 and received as changes in the magnetic flux by the antenna coil 11. On receipt of the data by the antenna coil 11 from the non-contact IC card 20, the induced current is generated in the antenna coil 11 as a result of changes in the magnetic flux in the antenna coil 31 of the matching tuning circuit 30 electro-magnetically coupled with the antenna coil 11.

As the induced current, generated in the antenna coil 11, is changed with the magnetic flux, the data carried by the carrier wave with the carrier frequency fc is transmitted to the antenna coil 11 as changes in the induced current.

The reader/writer for IC 14 demodulates this induced current to acquire data transmitted from the non-contact IC card 20.

The non-contact IC card 20 includes a parallel resonance circuit 23, which is a serial connection of an antenna coil 21, as an inductor, and a tuning capacitor 22. An IC for a card 24 is connected in parallel with this parallel resonance circuit 23.

The antenna coil 21 receives the electrical waves, transmitted from the reader/writer 10 through the matching tuning circuit 30, as changes in the magnetic flux. In the parallel resonance circuit 23, there is generated the induced electromotive force operating in a direction of obstructing changes in the magnetic flux of the electrical waves received by the antenna coil 11. By this induced electromotive force, the parallel resonance circuit 23 is tuned in the vicinity of the frequency fc=13.56 MHz.

The IC for a card 24, connected in parallel with the parallel resonance circuit 23, is operated with this induced electromotive force as the operating power. The IC for a card 24, supplied with the operating power, controls the operation in receiving data sent from the reader/writer 10 and in transmitting data to the reader/writer 10.

In data receipt, the IC for a card 24 demodulates the electrical waves, transmitted from the reader/writer 10 through the matching tuning circuit 30 and received as changed in the magnetic flux in the antenna coil 21.

In data transmission, the IC for a card 24 modulates the carrier wave, with the carrier frequency fc, with data to be transmitted, to generate transmission signals. The IC for a card 24 changes the load of the antenna coil 21, responsive to data to be transmitted, to modulate the carrier wave, by way of load modulation.

The transmission signals, generated on modulation, are sent to the antenna coil 21 to generate a magnetic field. As the magnetic field, generated in the antenna coil 21, is changed with the transmission signals, the data carried by the carrier wave, with the carrier frequency fc, is transmitted, as changes in the magnetic flux, to an antenna coil 32 of the matching tuning circuit 30, electro-magnetically coupled with the antenna coil 21.

The matching tuning circuit 30 includes a parallel resonance circuit 34, comprised of a series connection of an antenna coil 31, as a first inductor, an antenna coil 32, as a second inductor, and a tuning capacitor 33.

Specifically, the matching tuning circuit 30 is comprised of the antenna coils 31, 32, arranged on a substrate 35, so as to be connected in series with the tuning capacitor 33.

The antenna coil 31 is electro-magnetically coupled, in a non-contact fashion, with the antenna coil 11, forming the parallel resonance circuit 13 in the reader/writer 10, and is shaped for communicating with the reader/writer 10.

The antenna coil 31 may be of any suitable shape, on the condition that it may communicate with the reader/writer 10. For example, the antenna coil 31 may be of an elliptical or a square shape, to say nothing of the circular shape shown in FIG. 1.

The antenna coil 31 does not have to be of the same shape as the antenna coil 11, on the condition that the antenna coil 31 is able to communicate with the reader/writer 10. However, in case the antenna coil 31 is approximately of the same shape and of the same size as the antenna coil 11, the electro-magnetic coupling may be stronger to achieve stable and highly efficient data communication.

On the other hand, the antenna coil 32 is electro-magnetically coupled, in a non-contact fashion, with the antenna coil 21 on the non-contact IC card 20, forming the parallel resonance circuit 23, such as to communicate with the non-contact IC card 20.

The antenna coil 32 may be of any suitable shape, on the condition that it may communicate with the reader/writer 10. For example, the antenna coil 31 may be of an elliptical or a circular shape, to say nothing of the square shape shown in FIG. 1.

The antenna coil 32 is desirably larger in size than the antenna coil 21, provided to the non-contact IC card 20, since then a sufficient amount of the magnetic flux can be passed through the antenna coil 21 even in case the center of the antenna coil 21 is offset from the center of the antenna coil 32.

For example, in case the non-contact information medium is a non-contact IC card, and is used as a commutation ticket for railway or bus, the non-contact IC card cannot be placed at a constant fixed position at all times with respect to the antenna coil 32 of the matching tuning circuit 30 for data communication. Thus, in such case, the antenna coil 32 is larger in size than the antenna coil of the non-contact IC card to assure more reliable data communication.

For example, if the non-contact information medium is a non-contact IC tag affixed to a toner cartridge of a printer, as a consumable commodity, and is to have data communication with the reader/writer 10 mounted to a preset inner chassis in a printer casing, in order to manage the residual toner quantity, the non-contact IC tag may be placed in a fixed position relative to the antenna coil 32 of the matching tuning circuit 30 for data communication. Thus, in such a case, more efficient data communication may be had with the antenna coil 32 sized to be approximately equal to the size of the antenna coil of the non-contact IC tag.

If the antenna coil 32 is slightly smaller in size than the antenna coil 21, communication may be had by adjusting the output of the reader/writer 10.

The antenna coil 32 does not have to be of the same size and shape as the antenna coil 21, on the condition that the antenna coil 32 is able to communicate with the non-contact IC card 20, as discussed above. However, if the antenna coil 32 is of the same size and shape as the antenna coil 21, the electro-magnetic coupling becomes stronger to realize more efficient stable data communication.

That is, the size as well as the shape of the antenna coils 31, 32 of the matching tuning circuit 30 is limited to a more or less extent by the shape of the antenna coil 11 of the reader/writer 10 and by the shape of the antenna coil 21 of the non-contact IC card 20, respectively, for the realization of the efficient stable wireless communication.

With the communication system 1, shown as the best embodiment for carrying out the present invention, the non-contact IC card 20 is used as the non-contact information medium. Hence, in the following explanation, it is assumed that the shape and the size of the antenna coil 32 are approximately the same as those of the antenna coil 21 of the non-contact IC card 20, and also that the shape and the size of the antenna coil 31 are approximately the same as those of the antenna coil 11 of the reader/writer 10.

Since the antenna coils 31, 32 are connected in series with each other so that these coils are wound in the same direction, the antenna coils 31, 32 may be deemed to be an inductor having a combined inductance $L=L1+L2$, where L1 is the inductance of the antenna coil 31 and L2 is the inductance of the antenna coil 32. Consequently, the parallel resonance circuit 34 may be deemed to be a resonance circuit comprised of a series connection of an inductor having a combined inductance L and the tuning capacitor 33.

Figure 3:
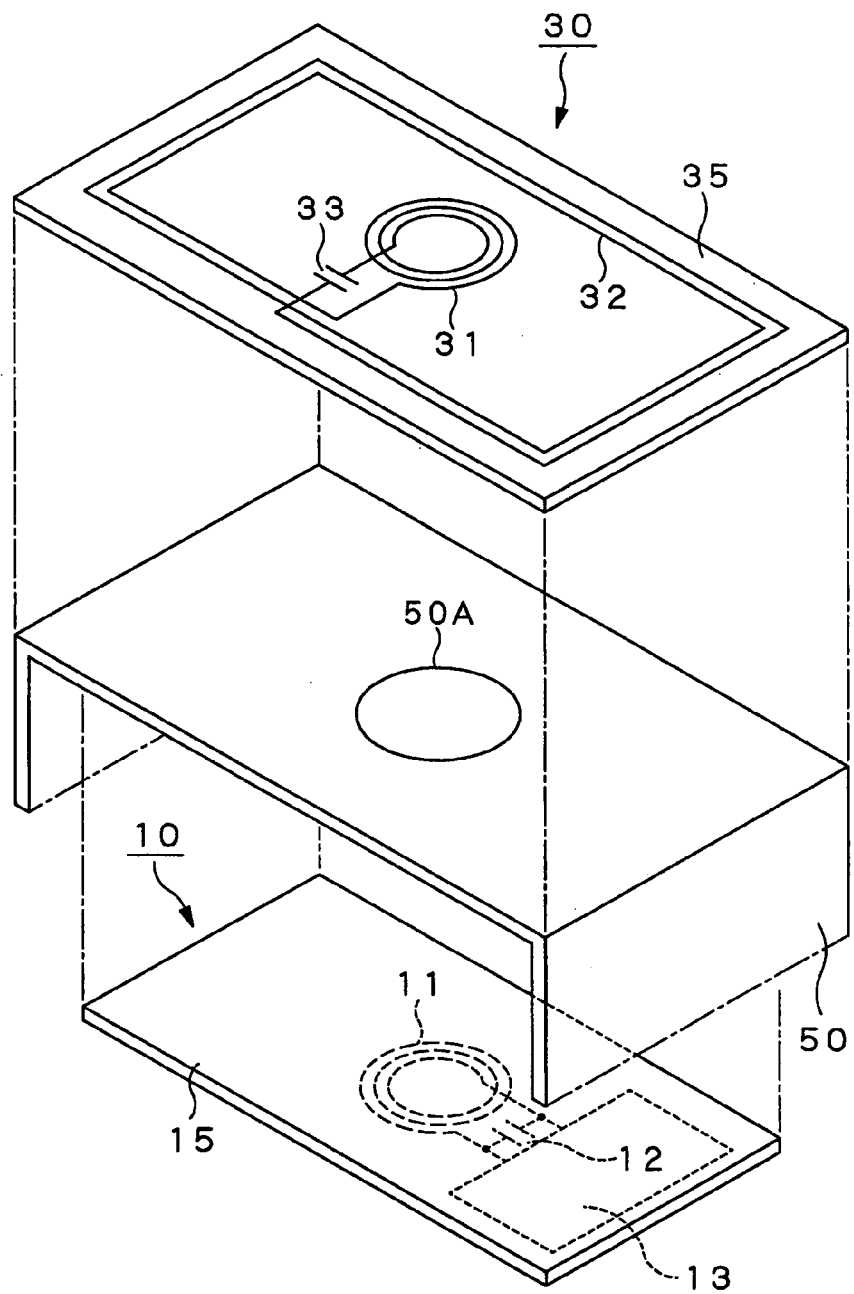
FIG. 3 shows an example of concrete setup of the communication system.

Referring to FIG. 3, a concrete setup example of the reader/writer 10 and the matching tuning circuit 30 is shown and, based on this setup example, the operating principle of the matching tuning circuit 30 is explained.

It is assumed that the reader/writer 10, provided on a substrate 15, is mounted on the back side of a metal chassis 50, as a casing of an apparatus on which to mount the reader/writer 10. The metal chassis 50, on which the reader/writer 10 is mounted in this manner, has an aperture 50A in a location which is to be register with the mounting position of the antenna coil 11 of the reader/writer 10.

The opening area of the aperture 50A is selected to be such that the strength of the metal chassis 50 is not impaired and such that there is no risk of leakage of the electromagnetic noise produced by e.g. an electronic circuit within the metal chassis 50. The shape and the size of the antenna coil 11 of the reader/writer 10 are selected so that the antenna coil will be housed within this aperture 50A.

Since the antenna coil 31 of the matching tuning circuit 30 is shaped so that the antenna coil 31 is electro-magnetically coupled with the antenna coil 11 in a non-contact fashion and so that the antenna coil 31 may communicate with the reader/writer 10, the shape of the antenna coil 31 is determined to a more or less extent if once the shape of the antenna coil 11 is determined.

On the other hand, the matching tuning circuit 30 is mounted for facing the reader/writer 10, mounted on the metal chassis 50, with the metal chassis 50 in-between. The matching tuning circuit 30 is mounted at this time so that the antenna coil 31 overlies the aperture 50A formed in the metal chassis 50. By so doing, the antenna coil 11 of the reader/writer 10 and the antenna coil 31 of the matching tuning circuit 30 may be electromagnetically coupled to each other in a non-contact fashion.

Since the reader/writer 10 mounted to the metal chassis 50 and the matching tuning circuit 30 may have wireless communication by the antenna coils 11, 31 being electro-magnetically coupled to each other in a non-contact fashion, no physical connection between the reader/writer 10 and the matching tuning circuit 30 is needed and hence the matching tuning circuit 30 may be mounted in position by a simplified technique of directly bonding the substrate 30 to the metal chassis 50 with e.g. a double-sided adhesive tape.

The matching tuning circuit 30, mounted to the metal chassis 50 operates as follows, by the electrical waves, transmitted from the reader/writer 10.

The antenna coil 31 of the parallel resonance circuit 34 of the matching tuning circuit 30 is traversed by a magnetic flux A, generated by a magnetic field, generated in turn by the antenna coil 11 of the reader/writer 10, for electromagnetically coupling the antenna coils 11, 31 to each other.

The induced electromotive force is generated in the parallel resonance circuit 34 by the magnetic flux A traversing the antenna coil 31, so that the induced current I by the induced electromotive force flows through the entire circuit. The parallel resonance circuit 34 is tuned by the induced electromotive force in the vicinity of the frequency $fc=13.56$ MHz.

When the induced current I flows through the antenna coil 32, a magnetic field is generated in the coil 32.

Figure 4:
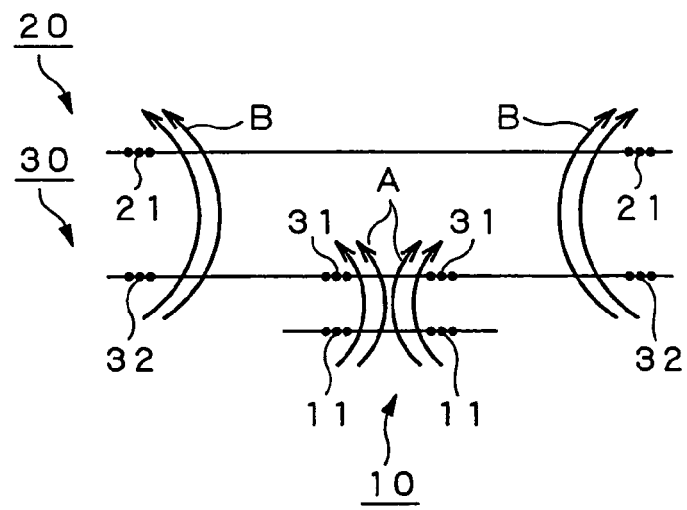
FIG. 4 illustrates the configuration of a matching tuning circuit of the communication system.
Figure 5:
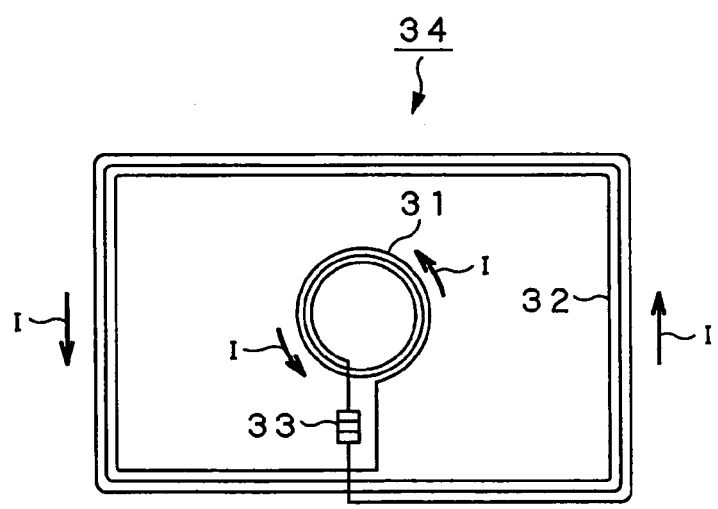
FIG. 5 shows an induction current I flowing in a matching tuning circuit of the communication system.

At this time, the non-contact IC card 20 may be moved to the vicinity of the matching tuning circuit 30. Thus, the magnetic flux B, generated by the magnetic field, generated in turn in the antenna coil 32, is passed through the inside of the antenna coil 21, as shown in FIG. 4. This electro-magnetically couples the antenna coils 32, 21 to each other.

When the magnetic flux B traverses the antenna coil 21 of the non-contact IC card 20 in this manner, the non-contact IC card 20 is activated so that the reader/writer 10 and the non-contact IC card 20 are now able to have wireless communication with each other through the matching tuning circuit 30.

Referring to the cross-sectional view of FIG. 6, another setup example of the reader/writer 10 and the matching tuning circuit 30 is hereinafter explained.

Figure 6:
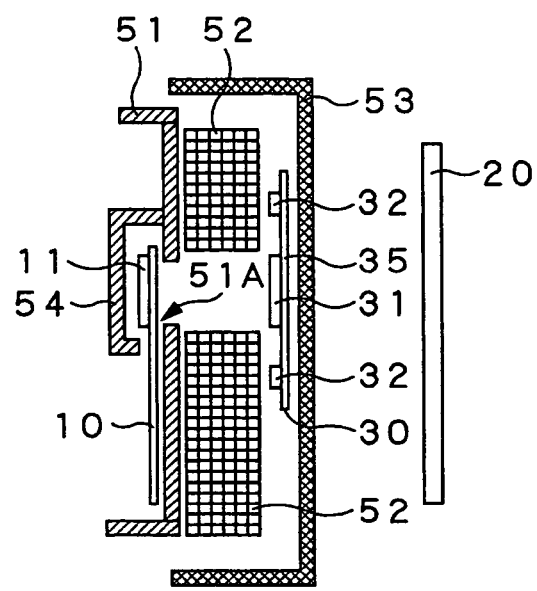
FIG. 6 shows another example of concrete setup of the communication system.

Referring to FIG. 6, the reader/writer 10 is mounted on the back-side surface of a metal chassis 51, as a casing of a device, adapted for being loaded with the reader/writer 10, so that the antenna coil 11 will be in register with an aperture 51A of the metal chassis 51.

On the front side surface of the metal chassis 51, having the reader/writer 10 mounted thereon, there is provided a metal component 52, such as a screw, such that the matching tuning circuit 30 cannot directly be mounted thereon, as shown in FIG. 6.

Thus, the matching tuning circuit 30 is mounted in position by bonding the substrate 35 of the matching tuning circuit 30 on the back side surface of a resin cover 53 overlying the aperture 51A of the metal chassis 51.

The matching tuning circuit 30 is bonded to the back-side surface of the resin cover 53, so that, when the resin cover 53 is mounted to the metal chassis 51, the antenna coil 31 of the matching tuning circuit 30 is in register with the antenna coil 11 of the reader/writer 10.

The cover 53, to which is bonded the matching tuning circuit 30, is formed of nonmagnetic resin, in order to cause no loss of the magnetic flux by the magnetic field generated in the antenna coil 32 of the matching tuning circuit 30. The substrate 35 of the matching tuning circuit 30 is of an extremely thin thickness, and is e.g. a flexible substrate, so as not to affect the magnetic field generated in the antenna coil 32.

A shield plate 54 may also be provided in order to prevent the effect of the electromagnetic noise generated in the device designed for carrying the reader/writer 10. The shield plate 54 needs only to be mounted to overlie the antenna coil 11. At this time, caution should be exercised so that the shield plate 54 is kept aloof from the reader/writer 10 in order to prevent the function of the antenna coil 11 from being impaired.

The matching tuning circuit 30, mounted to the resin cover 53, may also be mounted to the inner side of a rotatable door, provided to e.g. a casing of the device loaded with the reader/writer 10, in a manner not shown, for saving the spacing.

Thus, there is no necessity for providing the wiring for the matching tuning circuit 30, in order for the matching tuning circuit 30 to communicate with the reader/writer 10, and the matching tuning circuit 30 may be separated from the reader/writer 10 and mounted freely to any place within the sphere of electro-magnetic coupling. The result is the communication system 1 with an extremely high degree of mounting freedom.

Figure 7:
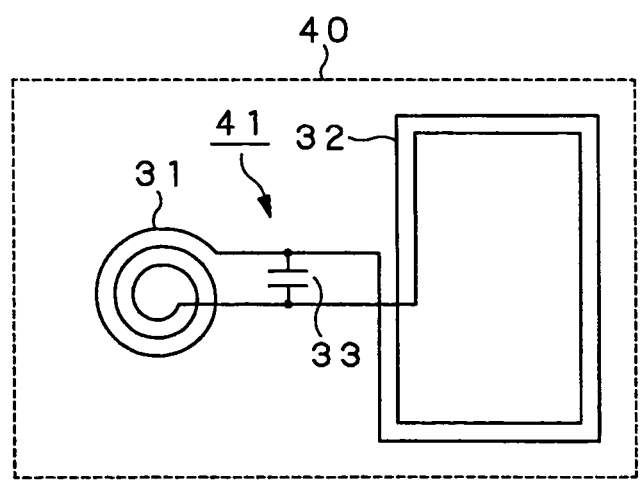
FIG. 7 shows a matching tuning circuit provided with a parallel-connected antenna coil.

In the matching tuning circuit 30 of the above-described communication system 1, the antenna coils 31, 32 are connected in series with each other. In the communication system 1, a matching tuning circuit 40, in which a parallel resonance circuit 41 is made up by a parallel connection of the antenna coils 31, 32 and the tuning capacitor 33, as shown in FIG. 7, may be used in place of the matching tuning circuit 30. The case of using the matching tuning circuit 40 is not explained in detail because the operation of the communication system 1 gives the identical effect in case the matching tuning circuit 40 is used in place of the matching tuning circuit 30.

Meanwhile, the tuning capacitor 33 is connected in series with both the antenna coils 31, 32, as shown in FIG. 7.

(Embodiment)

By way of an embodiment, the results of an experiment, conducted for measuring the effect by the matching tuning circuit 30, are shown.

In the experiment, the area which allows for communication for the case of using the matching tuning circuit 30 and that for the case of not using the matching tuning circuit 30, in the wireless communication between the reader/writer 10 and the non-contact IC card 20, were measured and compared to each other.

The same experiment was conducted as an iron plate having an aperture of the same shape as the antenna coil 11 of the reader/writer 10 was interposed between the reader/writer 10 and the non-contact IC card 20, in order to verify the effect by the matching tuning circuit 30 under the actual assumed use condition of the matching tuning circuit 30, as shown in FIGS. 3 and 6.

(Experiment 1)

Figure 8:
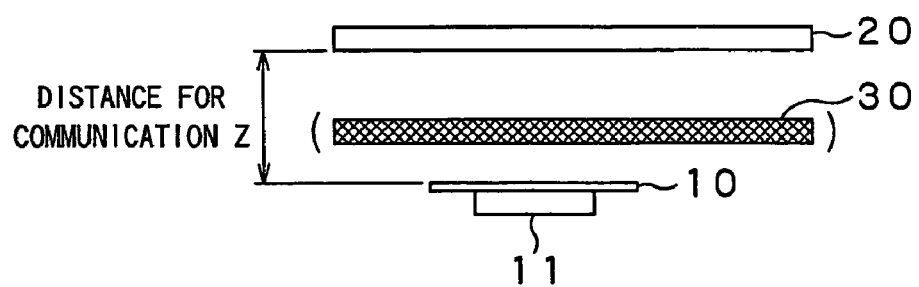
FIG. 8 illustrates an experiment 1 carried out for verifying the effect of the matching tuning circuit.

In an experiment 1, measurement was made of the area which allows for communication, in case the reader/writer 10 and the non-contact IC card 20 were arranged in a free space devoid of an obstacle, and the reader/writer 10 was activated in this state, and of the area which allows for communication, in case the matching tuning circuit 30 was interposed between the reader/writer 10 and the non-contact IC card 20, and the reader/writer 10 was activated in this state, as shown in FIG. 8.

The antenna coil 11 of the reader/writer 10 was circular in shape, with a diameter on the order of 25 mm. The antenna coil 31 of the matching tuning circuit 30 was of approximately the same shape. The non-contact IC card 20 used was of the size of 54 mm in length, 85.6 mm in width and 0.76 mm in thickness, as provided for in the ISO (International Organization for Standardization). The antenna coil 21, enclosed in the non-contact IC card 20, was wound to approximate the size of the non-contact IC card 20. The antenna coil 32 of the matching tuning circuit 30 was approximately of the same shape as the antenna coil 21.

The area which allows for communication, and which is to be measured, is now explained. The area which allows for communication, and which is now to be measured, is defined by a distance for communication Z, representing the distance which allows for communication, in case the non-contact IC card 20 is moved vertically relative to the reader/writer 10, and by a distance for communication XY, representing the distance which allows for communication, in case the non-contact IC card 20 is moved horizontally relative to the reader/writer 10.

Specifically, the distance for communication Z is a distance up to which the communication is possible when the center of the antenna coil 11 of the reader/writer 10, placed horizontally, is confounded with the center of the major plane surface of the non-contact IC card 20, and when the non-contact IC card 20 is moved in the vertical direction, as it is kept parallel to the antenna coil 11.

Figure 9:
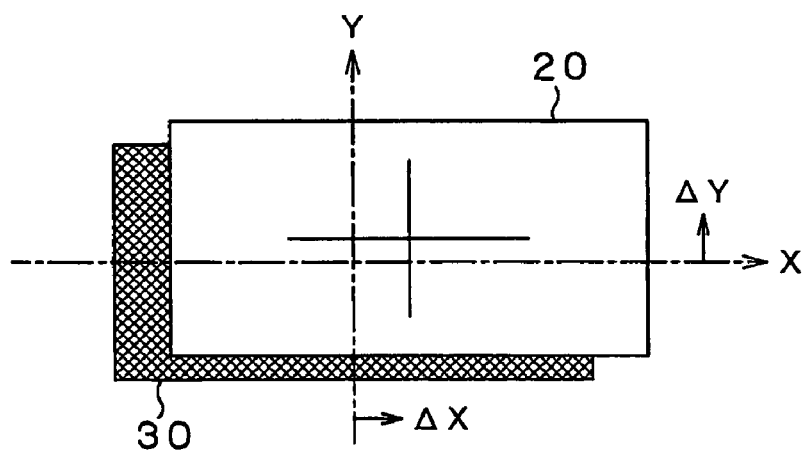
FIG. 9 illustrates a communication range XY in the experiment 1.

The distance for communication XY is a distance up to which the communication is possible when the non-contact IC card 20, placed horizontally at a preset distance with respect to the antenna coil 11 of the reader/writer 10, is optionally moved along the X-axis direction and along the Y-axis direction within the X-Y coordinate plane shown in FIG. 9. This distance for communication may be found by measuring the trajectory of the center point of the non-contact IC card 20.

This distance for communication Z and the distance for communication XY, thus measured, may be used as indexes for the effect of the matching tuning circuit 30.

Figure 10:
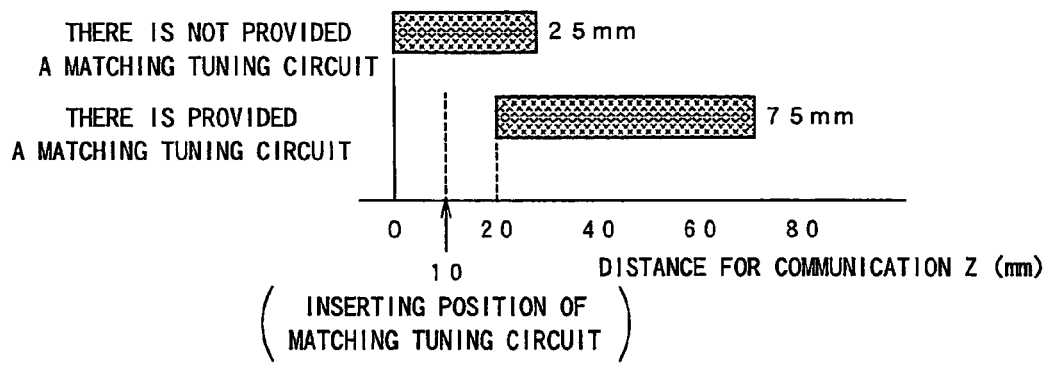
FIG. 10 shows the results of an experiment on a communication range Z in the experiment 1.

First, FIG. 10 shows the results of measurement of the distance for communication Z without the matching tuning circuit 30 and the results of measurement of the distance for communication Z with the matching tuning circuit 30 placed in position. Meanwhile, since the matching tuning circuit 30 is mounted at a distance of 10 mm from the antenna coil 11 of the non-contact IC card 10, the distance for communication for the case the matching tuning circuit 30 is placed in position was measured from the position of the intervening matching tuning circuit 30.

The distance for communication Z without the matching tuning circuit 30 was 10 to 25 mm, as shown in FIG. 10. The same distance Z with the matching tuning circuit 30 interposed in position was 20 to 75 mm. Thus, it may be seen that, by placing the matching tuning circuit 30 between the reader/writer 10 and the non-contact IC card 20, the distance for communication Z is approximately tripled.

If, in case the matching tuning circuit 30 is placed in position, the non-contact IC card 20 is at a distance of 10 to 20 mm from the antenna coil 11, the communication becomes infeasible because the non-contact IC card 20 and the matching tuning circuit 30 interfere with each other and become unstable in operation. This inconvenience may be overcome by strictly matching the resonance frequency of the non-contact IC card 20 to that of the matching tuning circuit 30 or by significantly separating the two resonance frequencies from each other.

Figure 11:
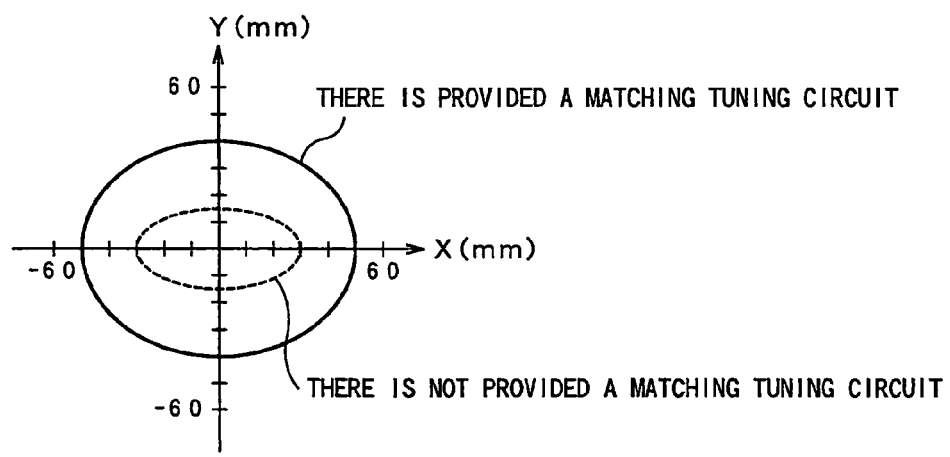
FIG. 11 shows the results of an experiment on the communication range XY in the experiment 1.

FIG. 11 shows the results of measurement of the distance for communication XY without the matching tuning circuit 30 and the results of measurement of the distance for communication XY with the matching tuning circuit 30 placed in position.

In case the matching tuning circuit 30 is not used, the distance for communication XY was measured at a location separated in the vertical direction by 10 mm from the center of the antenna coil 11 of the reader/writer 10. In case the matching tuning circuit 30 is used, the distance for communication XY was measured at a location separated 10 mm in the vertical direction from the center of the antenna coil 32 of the matching tuning circuit 30.

Meanwhile, the location of insertion of the matching tuning circuit 30 is 10 mm away from the reader/writer 10, as set forth above.

In the absence of the matching tuning circuit 30, the distance for communication XY is such that $-30 \leq X$ (mm) $\leq 30$ and $-15 \leq Y$ (mm) $\leq 15$, as shown in FIG. 11. That is, the distance for communication XY is defined to be the inside of an ellipse, with a long axis of 60 mm and a short axis of 30 mm, as indicated by a broken line.

In case the matching tuning circuit 30 is placed in position, the distance for communication XY is such that $-50 \leq X$ (mm) $\leq 50$ and $-40 \leq Y$ (mm) $\leq 40$, as shown in FIG. 11. That is, in FIG. 11, the distance for communication XY is defined to be the inside of an ellipse, with a long axis of 100 mm and a short axis of 80 mm, as indicated by a solid line.

Thus, it may be seen that, by placing the matching tuning circuit 30 between the reader/writer 10 and the non-contact IC card 20, the distance for communication XY is quadrupled.

(Experiment 2)

Figure 12:
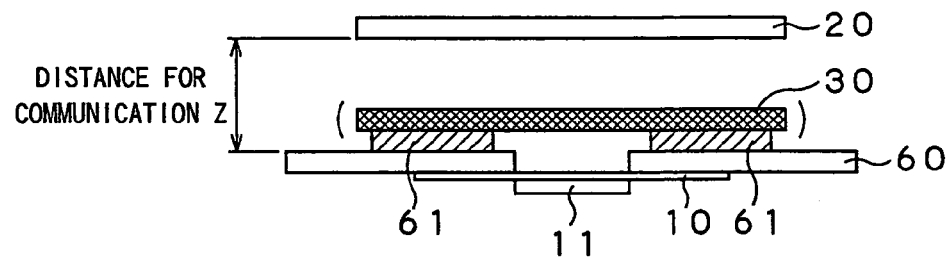
FIG. 12 illustrates an experiment 2 carried out for verifying the effect of the matching tuning circuit.
Figure 13:
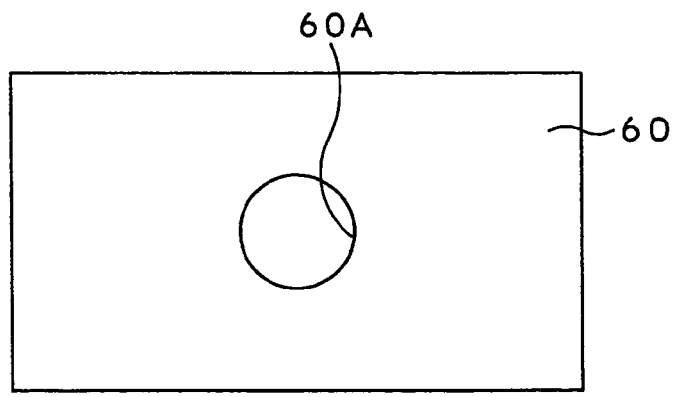
FIG. 13 illustrates an iron plate used in the experiment 2.

In the experiment 2, the reader/writer 10 was bonded to an iron plate 60, which iron plate, stuck to the reader/writer 10, was placed so as to prove an obstacle between the reader/writer 10 and the non-contact IC card 20 to approximate the actual use state, as shown in FIG. 12. The distance for communication Z and the distance for communication XY were measured for the case in which the matching tuning circuit 30 was used and for the case in which the matching tuning circuit 30 was not used.

In the iron plate 60, there is bored an aperture 60A of approximately the same shape as that of the antenna coil 1 of the reader/writer 10. When the reader/writer 10 is stuck to the iron plate 60, attention is to be paid so that the aperture 60A is in register with the antenna coil 11.

In the experiment 2, the reader/writer 10, non-contact IC card 20 and the matching tuning circuit 30 used are to be exactly the same as those used in the experiment 1. In using the matching tuning circuit 30, a spacer 61 is interposed between the iron plate 60 and the matching tuning circuit 30, and the separation between the antenna coil 11 of the reader/writer 10 and the matching tuning circuit 30 is set to 5 mm, as shown in FIG. 12.

Figure 14:
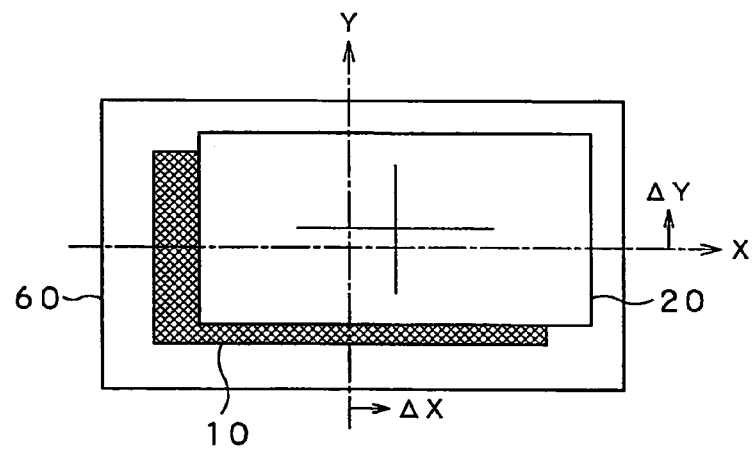
FIG. 14 shows the communication range XY in the experiment 2.
Figure 15:
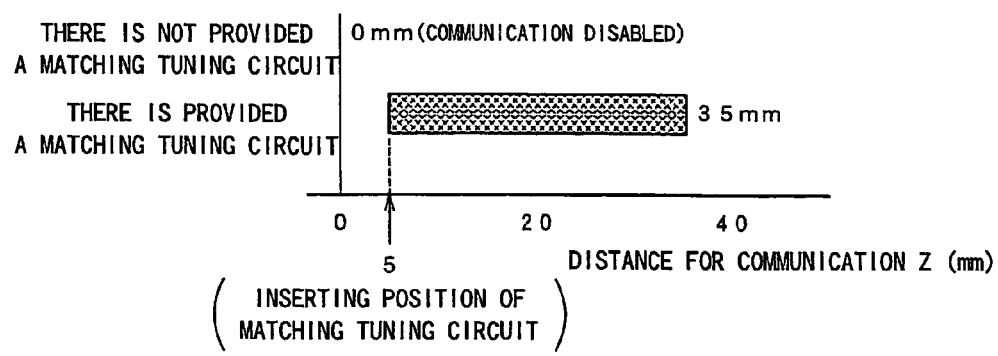
FIG. 15 shows the results of an experiment on the communication range Z in the experiment 2.

The measured results of the distance for communication Z, shown in FIG. 12, and those for the distance for communication XY, shown in FIG. 14, are shown below. First, FIG. 15 shows the measured results of the distance for communication Z, in the absence of the matching tuning circuit 30, and those of the distance for communication Z with the matching tuning circuit 30 placed in position. Meanwhile, since the matching tuning circuit 30 in the experiment 2 is placed at a separation of 5 mm from the antenna coil 11 of the reader/writer 10, the distance for communication Z was measured from the position of the matching tuning circuit 30.

In the absence of the matching tuning circuit 30, the communication disabled state was invited, in which communication is disabled under the influence of the iron plate 60, as shown in FIG. 15. The distance for communication Z, in case the matching tuning circuit 30 was placed in position, was 5 to 35 mm.

Thus, by introducing the matching tuning circuit 30 between the reader/writer 10 non-contact IC card 20, the wireless communication by the reader/writer 10 and the non-contact IC card 20 may be improved from the communication disabled state to a practically satisfactory state.

Figure 16:
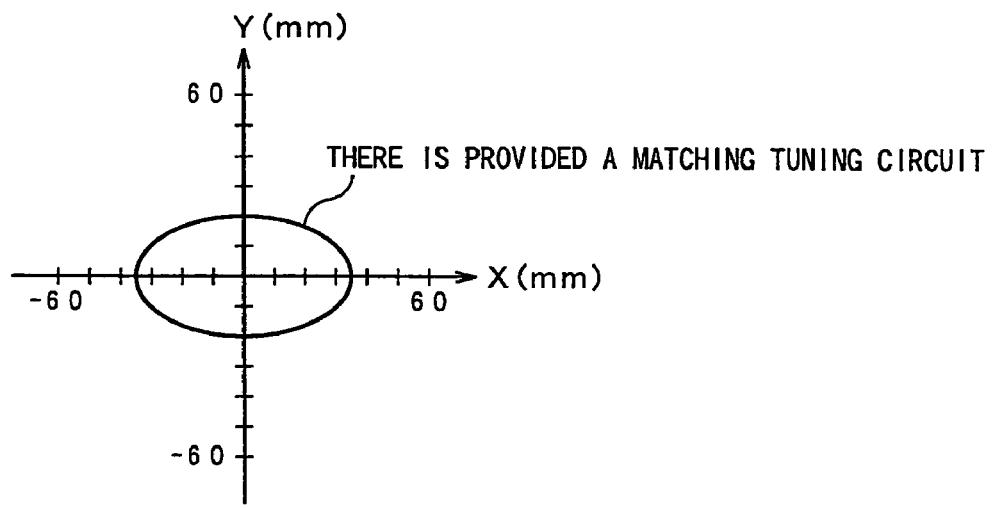
FIG. 16 shows the results of an experiment on the communication range Z in the experiment 2.
Figures 17A, 17B:
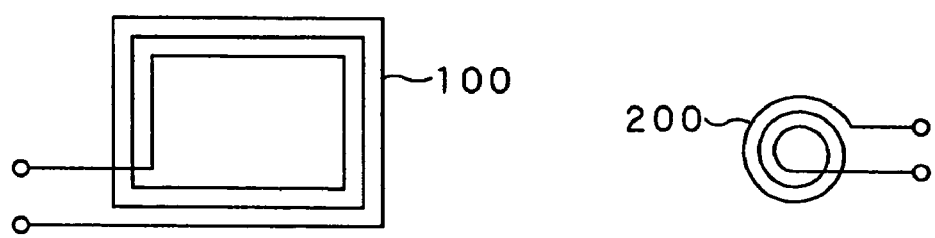
FIG. 17A shows an example of an antenna coil of a non-contact IC card and FIG. 17B shows an example of an antenna coil for a reader/writer.
Figure 18:
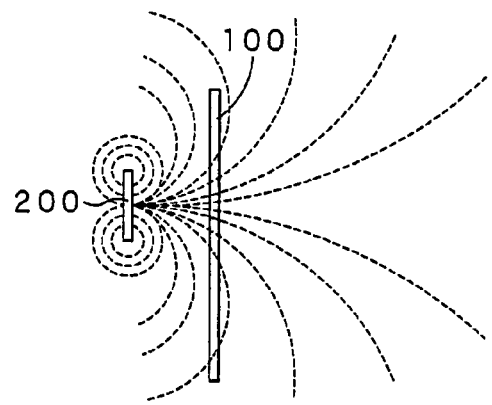
FIG. 18 shows the magnetic flux passed through the antenna coil of the non-contact IC card.
Figure 19:
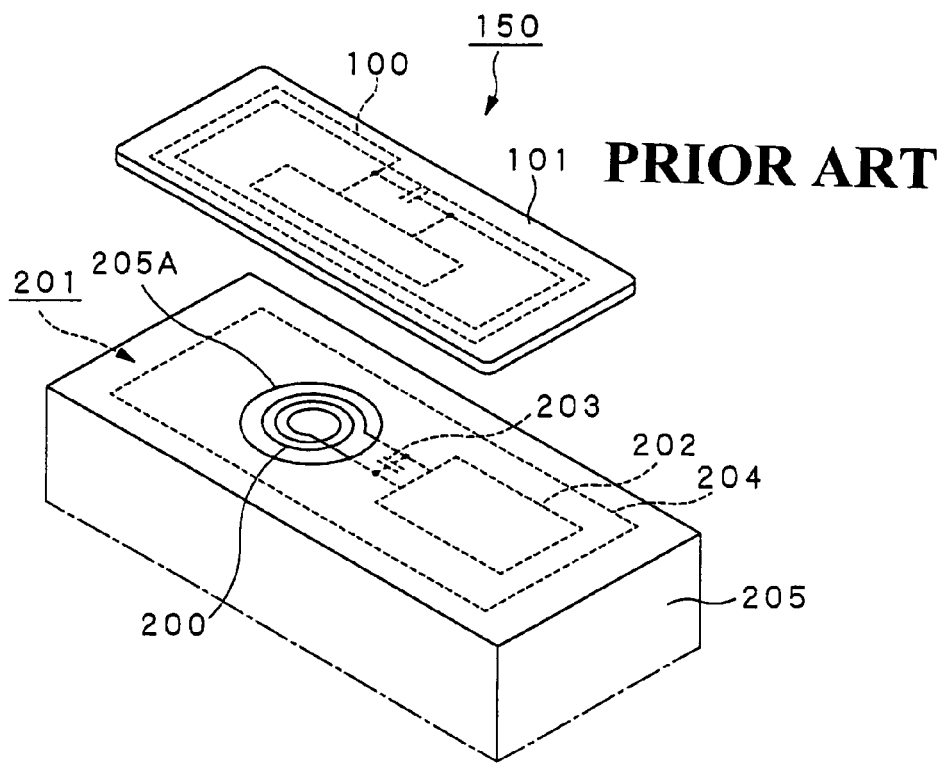
FIG. 19 shows an example of concrete setup of a reader/writer of a communication system shown as a prior art.
Figure 20:
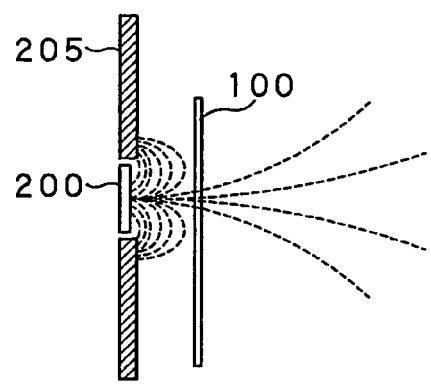
FIG. 20 shows the magnetic flux passed through an antenna coil of a non-contact IC card when an antenna coil of the reader/writer is mounted on a metal chassis.
Figure 21:
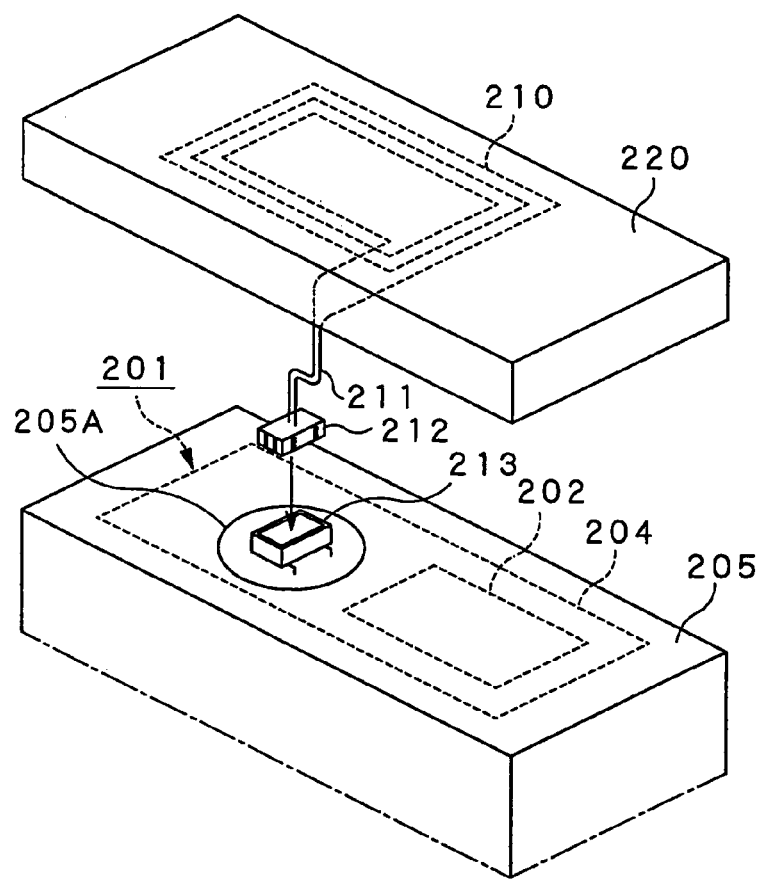
FIG. 21 shows an example of mounting the antenna coil of the reader/writer of the communication system of the prior art as a relay antenna.

FIG. 16 shows the measured results of the distance for communication XY in the absence of the matching tuning circuit 30 and those of the same distance with the matching tuning circuit 30 placed in position.

In the absence of the matching tuning circuit 30, the distance for communication XY was measured at a position 5 mm spaced apart in the vertical direction from the center of the antenna coil 11 of the reader/writer 10 and, in case the matching tuning circuit 30 was placed in position, the same distance XY was measured at a location 5 mm spaced apart from the center of the antenna coil 32 of the matching tuning circuit 30.

It is noted that the matching tuning circuit 30 is introduced at a position 5 mm spaced apart from the antenna coil 11 of the reader/writer 10, as noted previously.

In case the matching tuning circuit 30 is not used, the communication is disabled, as shown in FIG. 16. The distance for communication XY is such that $-35 \leq X$ (mm) $\leq 35$ and $-20 \leq Y$ (mm) $\leq 20$. That is, as shown in FIG. 16, the distance for communication XY is defined to be the inside of an ellipse, with a long axis of 70 mm and a short axis of 40 mm, as indicated by a solid line in FIG. 16.

Thus, it may be seen that, by placing the matching tuning circuit 30 between the reader/writer 10 and the non-contact IC card 20, the wireless communication by the reader/writer 10 and the non-contact IC card 20 may be improved from the communication disabled state to a practically satisfactory state.

What is claimed is:

1. A relaying apparatus for relaying wireless communication of an electro-magnetic coupling system, mediated by a carrier wave of a preset frequency, between an information read/write device and a non-contact information medium, said relaying apparatus comprising
   a first antenna coil electro-magnetically coupled to an antenna coil of said information read/write device;
   a second antenna coil, connected in series with said first antenna coil and electro-magnetically coupled with an antenna coil of said non-contact information medium;
   the first antenna coil being positioned within the second antenna coil; and
   a tuning capacitor connected to said first antenna coil and said second antenna coil;
   said first antenna coil, second antenna coil and the tuning capacitor forming a resonance circuit resonated at the resonance frequency which is the same as the resonance frequency of a resonance circuit of said read/write device and the resonance frequency of a resonance circuit of said non-contact information medium.

2. The relaying apparatus according to claim 1 wherein said first antenna coil is of approximately same size and shape as those of the antenna coil of said read/write device, and wherein
   said second antenna coil is of approximately same size and shape as those of the antenna coil of said non-contact information medium.

3. A relaying apparatus as set forth in claim 1, wherein the relaying apparatus is mounted to a metal chassis, the metal chassis having an aperture, the relaying apparatus being mounted to the metal chassis so that the first antenna coil completely overlaps the aperture.

4. A relaying apparatus as set forth in claim 3, further comprising a shield plate mounted over the antenna coil of the information read/write device and opposite the aperture, and prevents electro-magnetic noise from the reader/writer from escaping in a direction opposite the aperture.

5. A relaying apparatus as set forth in claim 4, wherein the shield plate is attached to the metal chassis.

6. A relaying apparatus as set forth in claim 3, wherein the relaying apparatus is mounted to the metal chassis using a non-magnetic resin.

7. A relaying apparatus as set forth in claim 3, wherein
   the first antenna is positioned to overlap the aperture and the aperture overlaps the antenna coil of the information read/write device.

8. A relaying apparatus as set forth in claim 1, wherein the tuning capacitor connected to said first antenna coil and said second antenna coil, is connected in series with the first antenna coil and the second antenna coil.

9. A relaying apparatus as set forth in claim 1, wherein the tuning capacitor connected to said first antenna coil and said second antenna coil, is connected in parallel with the first antenna coil and the second antenna coil.

10. A relaying apparatus as set forth in claim 1, wherein the relaying apparatus is positioned at a height above the antenna coil of the read/writer device at a height where the effective range of the signal from the read/writer device is extended to a distance of 20mm to 75mm.

11. A relaying apparatus for relaying wireless communication of an electro-magnetic coupling system, mediated by a carrier wave of a preset frequency, between an information read/write device and a non-contact information medium, said relaying apparatus comprising
    a first antenna coil electro-magnetically coupled to an antenna coil of said information read/write device;
    a second antenna coil, connected in parallel with said first antenna coil and electro-magnetically coupled with an antenna coil of said non-contact information medium;
    the first antenna coil being positioned within the second antenna coil; and
    a tuning capacitor connected to said first antenna coil and said second antenna coil;
    said first antenna coil, second antenna coil and the tuning capacitor forming a resonance circuit resonated at the resonance frequency which is the same as the resonance frequency of a resonance circuit of said read/write device and the resonance frequency of a resonance circuit of said non-contact information medium.

12. A communication system for wireless communication of an electro-magnetic coupling system, mediated by a carrier wave of a preset frequency, said communication system comprising
    an information read/write device including a first resonance circuit made up by a first antenna coil and by a first tuning capacitor connected in parallel with said first antenna coil, said information read/write device having wireless communication with a circuit electro-magnetically coupled to said first antenna coil, with the resonance frequency of said first resonance circuit as said frequency of said carrier wave;
    a non-contact information medium including a second resonance circuit made up by a second antenna coil and by a second tuning capacitor connected in series with said second antenna coil, said second resonance circuit resonating with a resonance frequency which is the same as the resonance frequency of said first resonance circuit and having wireless communication with a circuit electro-magnetically coupled to said second antenna coil; and
    a relaying device, including a third resonance circuit, made up by a third antenna coil, electro-magnetically coupled to said first antenna coil of said information write device, a fourth antenna coil connected in series with said third coil and electro-magnetically coupled with the antenna coil of said non-contact information medium, the third antenna coil being positioned within the fourth antenna coil, and a third tuning capacitor connected to at least one of said third and fourth antenna coils, said third relaying circuit resonating with the same resonance frequency as the resonance frequency of said first resonance circuit and said second resonance circuit, said relaying device relaying the wireless communication between said information read/write device and said non-contact information medium.

13. The communication system according to claim 12 wherein
    said third antenna coil of said relaying device is approximately of the same size and shape as said first antenna coil of said information read/write device; and wherein
    said fourth antenna coil of said relaying device is approximately of the same size and shape as said second antenna coil of said non-contact information medium.

14. A communication system as set forth in claim 12, wherein the relaying device is mounted to a metal chassis, the metal chassis having an aperture, the relaying device being mounted such that the third antenna coil completely overlaps the aperture.

15. A communication system as set forth in claim 14, further comprising a shield plate mounted over the first antenna coil and opposite the aperture and prevents electromagnetic noise from the first resonance circuit from escaping in the direction opposite the aperture.

16. A communication system as set forth in claim 15, wherein the shield plate is attached to the metal chassis.

17. A communication system as set forth in claim 14, wherein the relaying device is mounted to the metal chassis using a non-magnetic resin.

18. A communication system as set forth in claim 14, wherein
the third antenna is positioned to overlap the first antenna and the aperture, the first and third antennas being on opposite sides of the aperture.

19. A communication system as set forth in claim 12, wherein the tuning capacitor connected to the third antenna coil and the fourth antenna coil is connected either in series or in parallel with the third antenna coil and the fourth antenna coil.

20. A communication system as set forth in claim 12, wherein the relaying device is positioned at a height above the antenna coil of the read/writer device at a height where the effective range of the signal from the read/writer device at a distance of 20mm to 75mm.

21. A communication system for wireless communication of an electro-magnetic coupling system, mediated by a carrier wave of a preset frequency, said communication system comprising
an information read/write device including a first resonance circuit made up by a first antenna coil and by a first tuning capacitor connected in parallel with said first antenna coil, said information read/write device having wireless communication with a circuit electro-magnetically coupled to said first antenna coil, with the resonance frequency of said first resonance circuit as said frequency of said carrier wave;

a non-contact information medium including a second resonance circuit made up by a second antenna coil and by a second tuning capacitor connected in series with said second antenna coil, said second resonance circuit resonating with a resonance frequency which is the same as the resonance frequency of said first resonance circuit and having wireless communication with a circuit electro-magnetically coupled to said second antenna coil; and a relaying device including a third resonance circuit, made up by a third antenna coil, electro-magnetically coupled to said first antenna coil of said information write device, a fourth antenna coil connected in series with said third coil and electro-magnetically coupled with the antenna coil of said non-contact information medium, the third antenna coil being positioned within the fourth antenna coil, and a third tuning capacitor connected to each of said third and fourth antenna coils, said third relaying circuit resonating with the same resonance frequency as the resonance frequency of said first resonance circuit and said second resonance circuit, said relaying device relaying the wireless communication between said information read/write device and said non-contact information medium.

* * * * *